United States Patent
Xia et al.

(10) Patent No.: US 10,324,508 B2
(45) Date of Patent: Jun. 18, 2019

(54) METHOD AND APPARATUS FOR CONTROLLING A NETWORK NODE BY PROVIDING A VIRTUAL POWER DISTRIBUTION UNIT

(71) Applicant: EMC IP Holding Company LLC, Hopkinton, MA (US)

(72) Inventors: Robert Guowu Xia, Shanghai (CN); Chao Wu, Shanghai (CN); Bryan Xiaoguang Fu, Shanghai (CN); Sophia Xiaoxia Shu, Shanghai (CN); Simon Xingwang Cai, Shanghai (CN); Li Zhai, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 12 days.

(21) Appl. No.: 15/455,232

(22) Filed: Mar. 10, 2017

(65) Prior Publication Data
US 2017/0262032 A1    Sep. 14, 2017

(30) Foreign Application Priority Data
Mar. 10, 2016    (CN) .......................... 2016 1 0136881

(51) Int. Cl.
| G06F 1/00 | (2006.01) |
| G06F 1/26 | (2006.01) |
| H02J 13/00 | (2006.01) |
| H04L 12/10 | (2006.01) |

(52) U.S. Cl.
CPC ................ *G06F 1/26* (2013.01); *G06F 1/263* (2013.01); *H02J 13/00* (2013.01); *H04L 12/10* (2013.01)

(58) Field of Classification Search
None
See application file for complete search history.

(56) References Cited

U.S. PATENT DOCUMENTS

| 9,912,534 | B2* | 3/2018 | Sudhoff-Ewers ............... G06F 9/45533 |
| 2007/0027973 | A1* | 2/2007 | Stein ................... H04L 41/0806 709/223 |
| 2010/0019575 | A1* | 1/2010 | Verges ..................... H02J 3/14 307/38 |
| 2013/0174150 | A1* | 7/2013 | Nakajima ............ G06F 9/45558 718/1 |
| 2017/0046240 | A1* | 2/2017 | Milojicic .............. G06F 1/3287 |

* cited by examiner

*Primary Examiner* — Nitin C Patel
(74) *Attorney, Agent, or Firm* — Brian J. Colandreo; Heath M. Sargeant; Holland & Knight LLP (57) ABSTRACT

A method and apparatus of controlling a network node by providing a virtual power distribution unit. The method comprises: providing a virtual PDU by using a computing device; and causing the virtual PDU to control power supply of the network node coupled to the virtual PDU according to a type of the network node. In some embodiments, not only physical nodes can be controlled, but also virtual nodes can be controlled.

14 Claims, 5 Drawing Sheets

METHOD AND APPARATUS FOR CONTROLLING A NETWORK NODE BY PROVIDING A VIRTUAL POWER DISTRIBUTION UNIT

RELATED APPLICATIONS

This application claim priority from Chinese Patent Application Number CN201610136881.9, filed on Mar. 10, 2016 at the State Intellectual Property Office, China, titled "METHOD AND APPARATUS FOR CONTROLLING A NETWORK NODE" the contents of which is herein incorporated by reference in its entirety.

FIELD

Embodiments of the present disclosure relate to the field of computing technology, and more particularly, to a method and apparatus of controlling a network node.

BACKGROUND

Power Distribution Units (PDUs) are used in a datacenter to control the power supply of electric equipment, such as compute nodes, storage nodes and switch nodes. Each PDU comprises a plurality of (e.g. 24 or 48) outlets each of which is coupled to one electric equipment so as to control its power supply. The number of electric equipment in the datacenter is huge, so a large number of PDUs are required.

In addition, PDUs manufactured by different vendors usually have different internal logic and different access modes. When software developers are developing infrastructure software like management & coordination (M&O) software, in order to guarantee that the software being developed is robust, reliable and stable, developers want to validate whether the software can support PDUs of different vendors. Furthermore, software developers might expect scale-out testing so as to validate whether the software can support hundreds and even thousands of PDUs, or might use hundreds and even thousands of PDUs to validate whether enough exceptions are captured. Nevertheless, to purchase PDUs of various vendors or purchase a large amount of PDUs for the above software testing will incur enormous costs, thereby being unrealistic.

SUMMARY

Therefore, to solve the problems in one or more existing solutions, there is a need for a technical solution for effectively controlling and monitoring network nodes.

According to a first aspect of the embodiments of the present disclosure, there is provided a method of controlling a network node. The method comprises: providing a virtual PDU by using a computing device; and causing the virtual PDU to control power supply of the network node coupled to the virtual PDU according to a type of the network node.

In some embodiments, the type of the network node includes at least one of a virtual type and a physical type.

In some embodiments, providing the virtual PDU by using the computing device comprises: providing a control component of the virtual PDU by using the computing device, the control component including a first type of control interface for the virtual type of network node and a second type of control interface for the physical type of network node, the first type of control interface being different from the second type of control interface.

In some embodiments, causing the virtual PDU to control power supply of the network node comprises: in response to receiving a control command from a user, causing the control component of the virtual PDU to perform acts including: identifying a virtual outlet of the virtual PDU to which the control command is directed; determining whether the type of the network node coupled to the virtual outlet is the virtual type or the physical type; and using the first type of control interface or the second type of control interface to control the network node based on the determining.

In some embodiments, using the first type of control interface or the second type of control interface to control the network node based on the determining comprises: converting, based on the determining, the control command to a control command that is suitable for the first type of control interface or the second type of control interface; and providing the converted control command to the first type of control interface or the second type of control interface.

In some embodiments, the virtual type of network node at least includes a first virtual type of network node and a second virtual type of network node, the second virtual type of network node being different from the first virtual type of network node; and the first type of control interface at least includes a first control interface for the first virtual type of network node and a second control interface for the second virtual type of network node, the first control interface being different from the second control interface.

In some embodiments, providing the virtual PDU by using the computing device comprises: causing the virtual PDU to be configured remotely.

In some embodiments, causing the virtual PDU to be configured remotely comprises: causing the virtual PDU to receive an error injection; and causing the virtual PDU to send a notification indicating the error injection to the user.

In some embodiments, the method further comprises: causing the virtual PDU to obtain from a virtual type of network node resource utilization efficiency of the virtual type of network node; and determining estimation of power consumption of the virtual type of network node based on the obtained resource utilization efficiency.

According to a second aspect of the embodiments of the present disclosure, there is provided an apparatus of controlling a network node. The apparatus comprises: a virtual PDU providing unit configured to provide a virtual PDU by using a computing device; and a control unit configured to cause the virtual PDU to control power supply of a network node coupled to the virtual PDU according to a type of the network node.

In some embodiments, the type of the network node includes at least one of a virtual type and a physical type.

In some embodiments, the virtual PDU providing unit is further configured to: provide a control component of the virtual PDU by using the computing device, the control component including a first type of control interface for the virtual type of network node and a second type of control interface for the physical type of network node, the first type of control interface being different from the second type of control interface.

In some embodiments, the control unit is further configured to in response to receiving a control command from a user, cause the control component of the virtual PDU to perform acts including: identifying a virtual outlet of the virtual PDU to which the control command is directed; determining whether the type of the network node coupled to the virtual outlet is the virtual type or the physical type;

and using the first type of control interface or the second type of control interface to control the network node based on the determining.

In some embodiments, the control unit is further configured to: convert, based on the determining, the control command to a control command that is suitable for the first type of control interface or the second type of control interface; and provide the converted control command to the first type of control interface or the second type of control interface.

In some embodiments, the virtual type of network node at least includes a first virtual type of network node and a second virtual type of network node, the second virtual type of network node being different from the first virtual type of network node; and the first type of control interface at least includes a first control interface for the first virtual type of network node and a second control interface for the second virtual type of network node, the first control interface being different from the second control interface.

In some embodiments, the control unit is further configured to: cause the virtual PDU to be configured remotely.

In some embodiments, the control unit is further configured to: cause the virtual PDU to receive an error injection; and cause the virtual PDU to send a notification indicating the error injection to the user.

In some embodiments, the control unit is further configured to: cause the virtual PDU to obtain from the virtual type of network node resource utilization efficiency of the virtual type of network node; and determine estimation of power consumption of the virtual type of network node based on the obtained resource utilization efficiency.

According to a third aspect of the embodiments of the present disclosure, there is provided a server. The server comprises: at least one processing unit; and a memory storing computer program instructions thereon which, when executed by the at least one processing unit, cause the server to perform the method according to the embodiments of the present disclosure.

According to a fourth aspect of the embodiments of the present disclosure, there is provided a computer program product including computer program instructions which, when executed on a computing device, causing the computing device to perform the method according to the embodiments of the present disclosure.

According to the embodiments of the present disclosure, a virtual PDU is provided using a computing device, i.e., a physical PDU is simulated using software, so that the obtained virtual PDU is easy to be copied and extended so as to simulate physical PDUs manufactured by different vendors. Thereby, the environment of a datacenter can be simulated using the obtained virtual PDU, so as to facilitate infrastructure software testing. In addition, the obtained virtual PDU controls power supply of a network node coupled to the virtual PDU according to type of the network node. Therefore, the obtained virtual PDU can conveniently control storage nodes or compute nodes, no matter whether these nodes are physical nodes or virtual nodes.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings.

DETAILED DESCRIPTION

Principles of the present disclosure are described below by means of several exemplary embodiments as shown in the accompanying drawings. It should be understood that these embodiments are described only for enabling those skilled in the art to better understand and further implement the present disclosure, rather for limiting the scope of the present disclosure in any manner.

As described above, PDUs manufactured by different vendors usually have different internal logic and different access modes. It is unrealistic to purchase PDUs of various vendors for infrastructure software testing or to purchase a large amount of PDUs for building a software testing environment. To this end, the embodiments of the present disclosure propose a technical solution for simulating physical PDUs by means of software.

Figure 1:
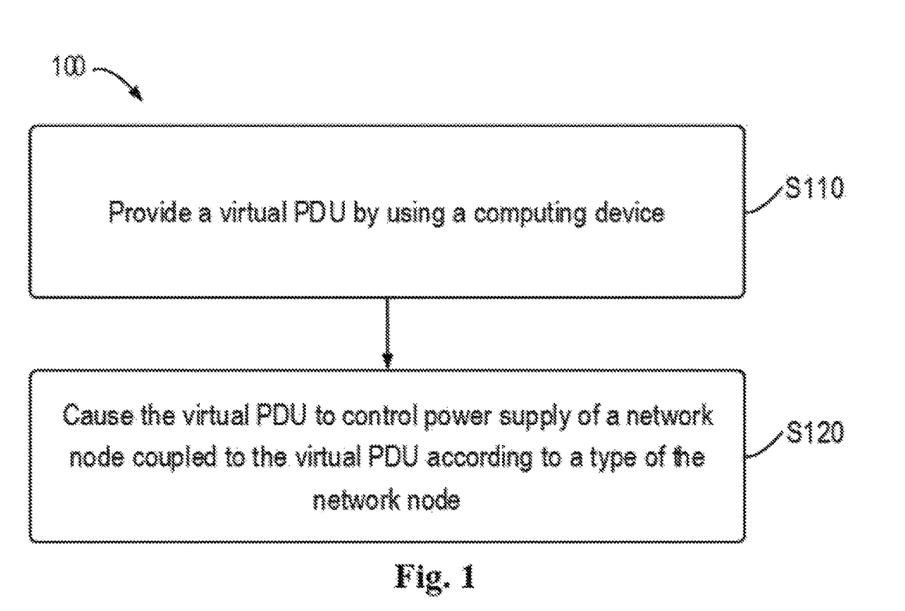
FIG. 1 shows a flowchart of a method for managing network devices according to one embodiment of the present disclosure.

FIG. 1 shows a flowchart of a method 100 for managing network devices according to one embodiment of the present disclosure.

As shown in FIG. 1, at S110, a virtual PDU is provided using a computing device. At S120, the virtual PDU is caused to control power supply of a network node that is coupled to the virtual PDU according to a type of the network node. The controlling power supply of the network node includes, but not limited to, powering the network node on, powering the network node off, and rebooting the network node.

In some embodiments, the computing device may be any desktop computer, portable computer, laptop computer, handheld device, cellular telephone, smart telephone, personal digital assistant, and any other appropriate device with computing capabilities.

In some embodiments, the type of the network node comprises at least one of a virtual type and a physical type. Hereinafter, the virtual type of network node is also referred to as "virtual node", and the physical type of network node is also referred to as "physical node". Examples of the virtual type of network node or "virtual node" include, but not limited to, virtual machine. Virtual machines may include virtual machines obtained from different vendors, such as VMware® workstation, VirtualBox™, QEMU™, etc. VMware is a registered trademark of VMware in the United States, other countries, or both. Examples of the physical type of network node or physical node include, but not limited to, server and switch. It should be understood in a data center scenario, compute nodes, storage nodes or switch nodes may be implemented not only on virtual nodes but also on physical nodes.

In some embodiments, the providing the virtual PDU using the computing device comprises: providing a user interface using the computing device, so as to cause the virtual PDU to communicate with a user via the user interface and based on a predefined communication protocol. Examples of the communication protocol include, but not limited to, the Simple Network Management Protocol (SNMP).

It may be understood that a physical PDU has a management information base (MIB) associated therewith. Each accessible resource in the physical PDU is abstracted as one object, the set of which objects constitute a MIB. The MIB defines a series of attributes of objects, such as name of an object, access permission of the object, data type of the object, etc. In this regard, in some embodiments, the providing the virtual PDU using the computing device comprises: obtaining a MIB associated with a physical PDU to be simulated, and simulating the physical PDU based on the MIB so as to obtain a corresponding virtual PDU.

In some embodiments, providing the virtual PDU using the computing device comprises: providing a PDU service component of the virtual PDU using the computing device, the PDU service component emulating functionalities and features of the corresponding physical PDU.

In some embodiments, providing the virtual PDU using the computing device comprises: providing a control component of the virtual PDU using the computing device, the control component comprising a first type of control interface for the virtual node and a second type of control interface for the physical node, the first type of control interface being different from the second type of control interface.

It may be understood that virtual machines obtained from different vendors, like VMware®, workstation, VirtualBox™, QEMU™, etc., usually have different interfaces which can be controlled from the outside. In this regard, the first type of control interface for the virtual node may comprise a plurality of different control nodes which are used for different virtual machines obtained from different vendors. Thereby, demands of users using virtual machines of different vendors can be satisfied.

In some embodiments, causing the virtual PDU to control power supply of a network node comprises: in response to receiving a control command from a user, causing the control component of the virtual PDU to perform acts including: identifying a virtual outlet of the virtual PDU to which the control command is directed; determining whether the type of the network node coupled to the virtual outlet is the virtual type or the physical type; and using the first type of control interface or the second type of control interface to control the network node based on the determining.

In some embodiments, using the first type of control interface or the second type of control interface to control the network node based on the determining comprises: converting, based on the determining, the control command to a control command that is suitable for the first type of control interface or the second type of control interface; and providing the converted control command to the first type of control interface or the second type of control interface.

As one example, where it is determined the type of the network node coupled to the virtual outlet is the virtual type, the control command is converted to a control command that is suitable for the first type of control interface, and the converted control command is provided to the first type of control interface so as to control the virtual node coupled to the virtual outlet.

As another example, where it is determined the type of the network node coupled to the virtual outlet is the physical type, the control command is converted to a control command that is suitable for the second type of control interface, and the converted control command is provided to the second type of control interface so as to control the physical node coupled to the virtual outlet.

It should be understood the physical node may be coupled to the virtual outlet of the virtual PDU by any appropriate means, and the scope of the embodiments of the present disclosure is not limited in this regard.

For example, the physical node may be coupled to the virtual outlet of the virtual PDU via a physical PDU that is capable of communicating with the virtual PDU. In other words, the physical node may be coupled to a physical outlet of a physical PDU, and the physical outlet of the physical PDU is associated with a predefined virtual outlet of the virtual PDU. Thereby, in response to receiving from the user a control command directed to the virtual outlet of the virtual PDU, the virtual PDU can identify a physical outlet associated with the virtual outlet; based on the physical PDU's MIB, convert the control command to a control command which can be identified by the physical outlet; and send the converted control command to the physical outlet so as to control the physical node coupled to the physical outlet.

For another example, the physical node may be coupled to the virtual outlet of the virtual PDU via a baseboard management controller (BMC) that is capable of communicating with the virtual PDU. In this case, in response to receiving from the user a control command directed to the virtual outlet of the virtual PDU, the virtual PDU can identify a BMC associated with the virtual outlet; convert the control command to a control command which can be identified by the BMC; and send the converted control command to the BMC so as to control the physical node coupled to the BMC.

In some embodiments, providing the virtual PDU using the computing device comprises: causing the virtual PDU to be configured remotely. In other words, the administrator may remotely log on to the computing device according to any appropriate remote login protocol, so as to remotely configure the virtual PDU. Examples of the remote login protocol may include, but not limited, to: the Secure Shell (SSH) protocol, the Telnet protocol and HTTP protocol.

In some embodiments, remotely configuring the virtual PDU comprises at least one of:

Setting IP address for virtual PDU.

Mappings between virtual PDU outlets and network devices.

Generally one outlet is used for controlling one network device. In some embodiments, however, two outlets could be mapped, to one network device to simulate PDU redundancy.

Start, stop, or restart virtual PDU service.

Password settings for virtual PDU outlet. Some physical PDUs need password to control the power supply of network devices.

Dynamic telemetry data setting.

Telemetry mode may be set for virtual PDU. Once a virtual PDU was in this mode, if a request to get telemetry data such as voltage, current, or power frequency is received from the user, the virtual PDU will return different values to the user every time.

Setting threshold.

A threshold may be set for virtual PDU. For example, when the voltage on a certain outlet of a virtual PDU is over the threshold, the virtual PDU will generate a notification and send it to the SNMP manager or requester.

Error injection.

An error may be intentionally inserted to a virtual PDU so as to cause the software developer to test if the developed software could handle or find the error. In this regard, the virtual PDU may be caused to receive error injection and send a notification indicating the error injection to the user.

It should be understood that since the virtual PDU according to the embodiments of the present disclosure may provide both control interfaces for virtual nodes and also control interfaces for physical nodes, and control interfaces for virtual nodes may include control interfaces for a plurality of virtual node vendors, the virtual PDU scheme according to the embodiments of the present disclosure may extent to other fields so as to control electric equipment other than virtual nodes and physical nodes, such as air conditioners.

Figure 2:
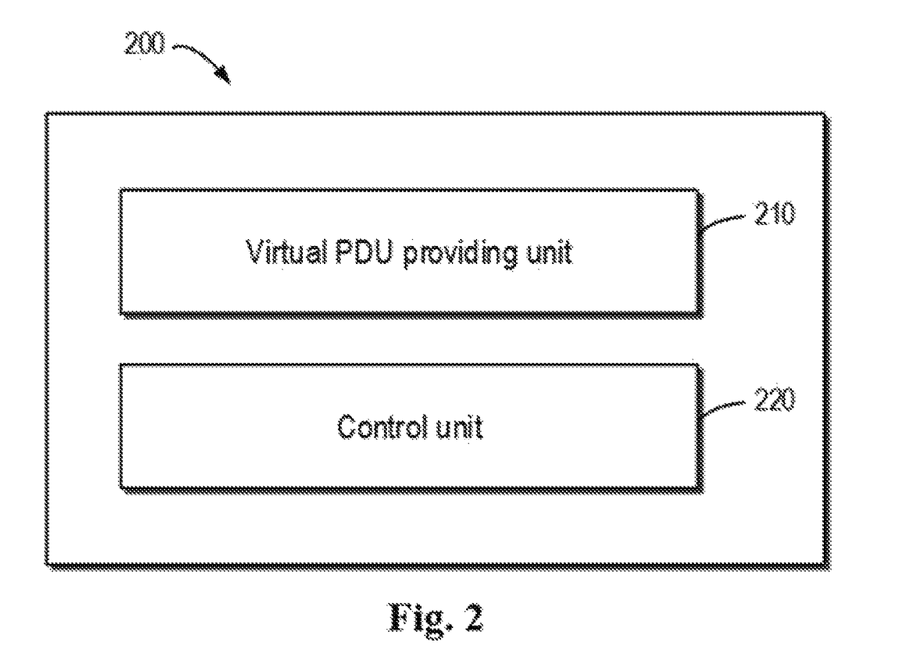
FIG. 2 shows a block diagram of an apparatus of controlling a network node according to one embodiment of the present disclosure.

The embodiments of the present disclosure further provide an apparatus of controlling a network node. FIG. 2 shows a block diagram of an apparatus 200 of controlling a network node according to one embodiment of the present disclosure. The apparatus 200 may be implemented on any appropriate computing device. As shown in FIG. 2, the apparatus 200 comprises a virtual PDU providing unit 210 configured to provide a virtual PDU and a control unit 220 configured to cause the virtual PDU to control power supply of a network node coupled to the virtual PDU according to a type of the network node.

In some embodiments, the type of the network node includes at least one of a virtual type and a physical type.

In some embodiments, the virtual PDU providing unit 210 is further configured to: provide a control component of the virtual PDU, the control component comprising a first type of control interface for a virtual type of network node and a second type of control interface for a physical type of network node, the first type of control interface being different from the second type of control interface.

In some embodiments, the control unit 220 is further configured to, in response to receiving a control command from a user, cause the control component of the virtual PDU to perform acts including: identifying a virtual outlet of the virtual PDU to which the control command is directed; determining whether the type of the network node coupled to the virtual outlet is the virtual type or the physical type; and using the first type of control interface or the second type of control interface to control the network node based on the determining.

In some embodiments, the control unit 220 is further configured to: convert, based on the determining, the control command to a control command that is suitable for the first type of control interface or the second type of control interface; and provide the converted control command to the first type of control interface or the second type of control interface.

In some embodiments, the control unit 220 is further configured to: cause the virtual PDU to be configured remotely.

In some embodiments, the control unit 220 is further configured to: cause the virtual PDU to receive an error injection; and cause the virtual PDU to send a notification indicating the error injection to a user.

In some embodiments, the virtual type of network node at least comprises a first virtual type of network node and a second virtual type of network node, the second virtual type of network node being different from the first virtual type of network node; and the first type of control interface at least includes a first control interface for the first virtual type of network node and a second control interface for the second virtual type of network node, the first control interface being different from the second control interface.

In some embodiments, the control unit 220 is further configured to: cause the virtual PDU to obtain from a virtual type of network node resource utilization efficiency of the virtual type of network node; and determine estimation of power consumption of the virtual type of network node based on the obtained resource utilization efficiency.

The embodiments of the present disclosure further provide a server comprising: at least one processing unit; and a memory storing computer program instructions thereon which, when executed by the at least one processing unit, cause the server to perform the method according to the embodiments of the present disclosure.

The embodiments of the present disclosure further provide a computer program product including computer program instructions which, when executed on a computing device, causing the computing device to perform the method according to the embodiments of the present disclosure.

Figure 3:
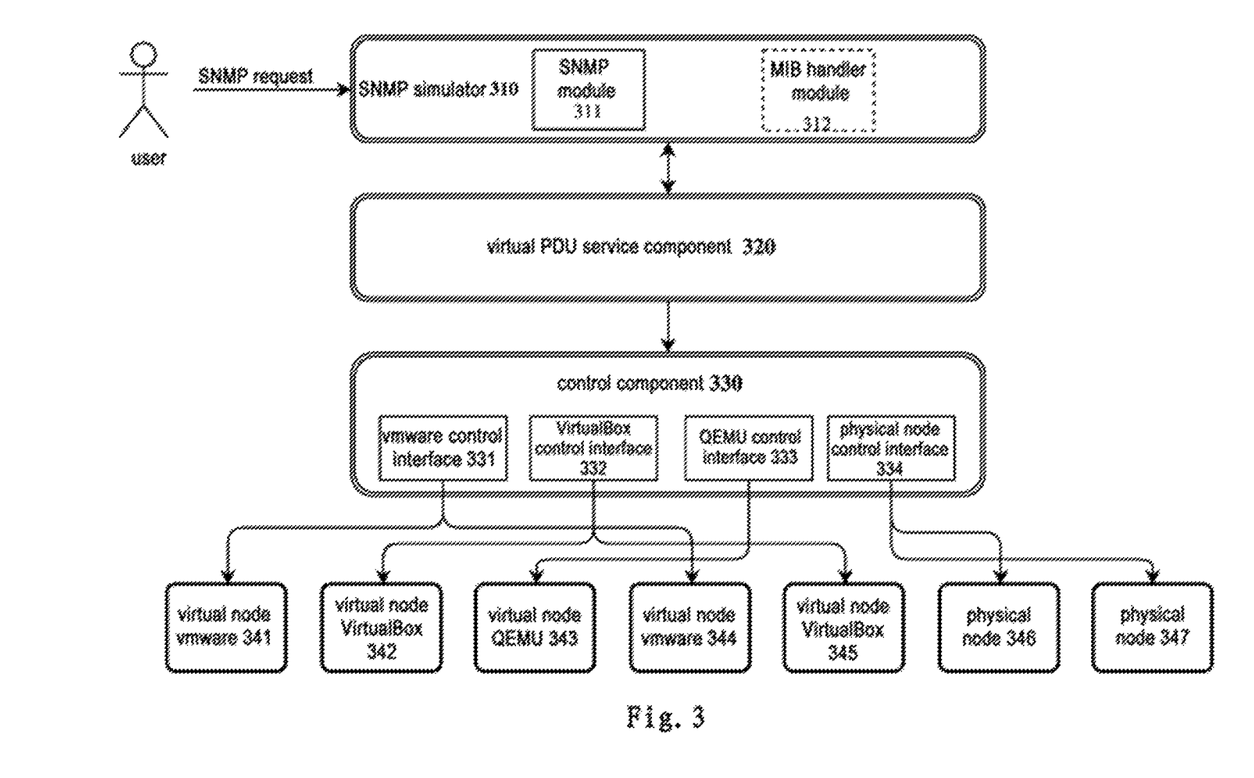
FIG. 3 shows a block diagram of an apparatus of controlling a network node according to another embodiment of the present disclosure.

FIG. 3 shows a block diagram of an apparatus 300 of controlling a network node according to another embodiment of the present disclosure. The apparatus 300 may act as one implementation of the apparatus 200 shown in FIG. 2.

As described above, a virtual PDU may communicate with users based on the SNMP protocol. In this regard, the apparatus 300 comprises an SNMP simulator 310 acting as a user interface of the virtual PDU. The SNMP simulator 310 comprises an SNMP module 311 and a MIB handler module 312 which is optional.

The SNMP module 311 is configured to receive SNMP requests from users and handle received SNMP requests. Examples of SNMP requests include, but not limited to, SNMP SET requests and SNMP GET requests. In addition, The SNMP module 311 is configured to receive an error injection from a user and send a notification indicating the error injection, such as a Trap message, to the user.

The MIB handler module 312 is configured to a MIB of a physical PDU to be simulated. For example, The MIB handler module 312 may be configured to obtain the MIB data from a physical PDU to be simulated which is being used by the datacenter and store the obtained MIB data to a MIB database (not shown). Alternatively, The MIB handler module 312 may be configured to locally generate MIB data based on MIB information of a physical PDU to be simulated provided by the PDU vendor and store the generated MIB data to the MIB database.

The apparatus 300 further comprises a virtual PDU service component 320, which is configured to emulate functionalities and features of the corresponding physical PDU. The MIB handler module 312, after receiving the SNMP request from the user, extracts from the received SNMP request an object identifier (OID) and a value of the OID, and sends the extracted OID and its value to the virtual PDU service component 320. Then, the virtual PDU service component 320 performs appropriate operations based on the OID and its value.

The apparatus 300 further comprises a control component 330. The control component 330 comprises a control interface for virtual nodes and a control interface for physical nodes, and the first type of control interface is different from the second type of control interface. As shown in FIG. 3, the virtual nodes include VMware® 341 and 342, VirtualBox™ 343 and 345, as well as QEMU™ 343. The physical nodes comprise physical nodes 346 and 347. Accordingly, the control interface for virtual nodes comprises a VMware® control interface 331, a VirtualBox™ control interface 332, a QEMU™ control interface 333, and a physical node control interface 334.

Figure 4:
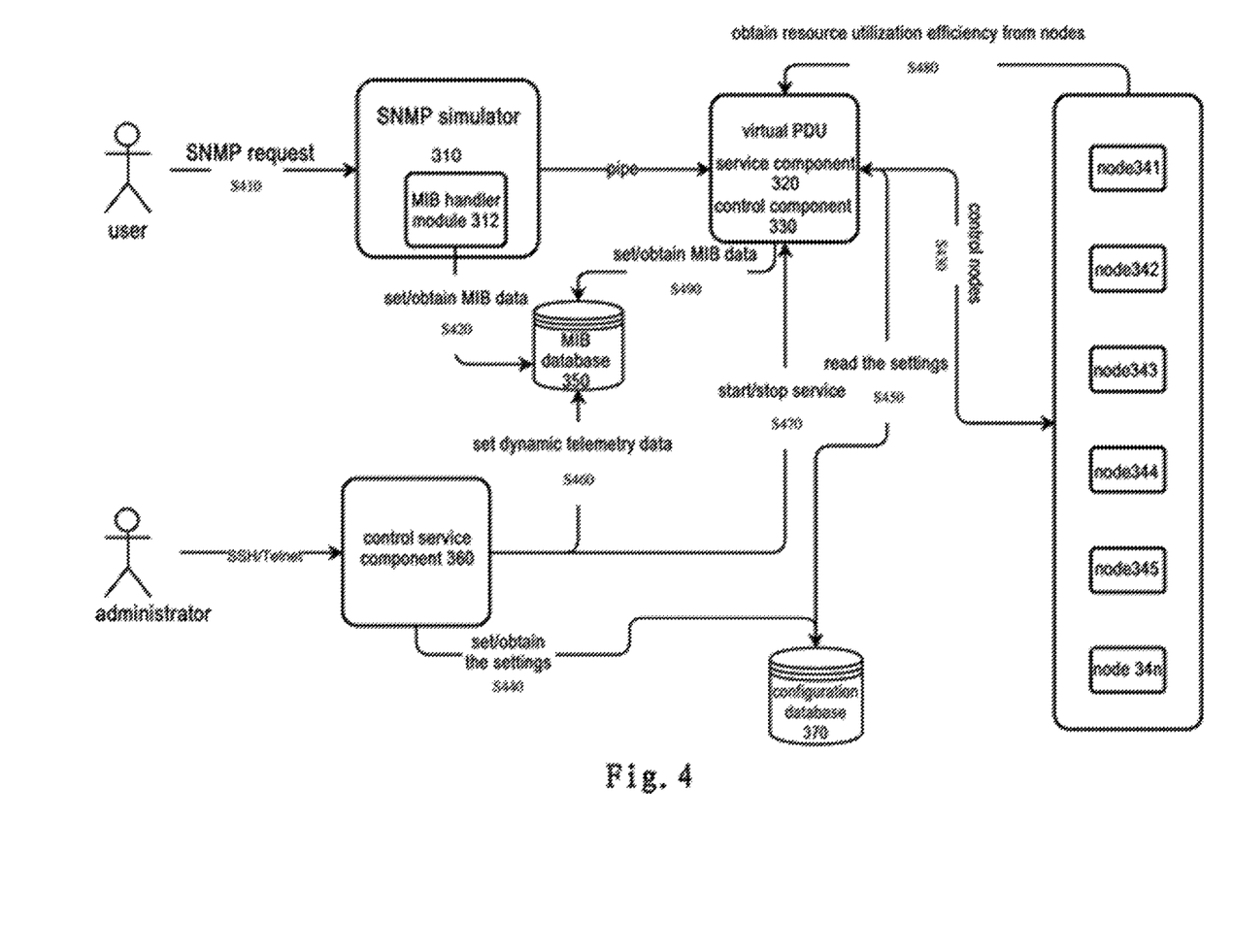
FIG. 4 shows communication among various components of the apparatus for managing a network node in FIG. 3.

FIG. 4 shows communication among various components of apparatus 300 of controlling a network node in FIG. 3.

At S410, SNMP simulator 310 receives an SNMP request from a user and handles the received SNMP request. Specifically, for example, if the received SNMP request is an SNMP SET request, then at S420, MIB handler module 312 reviews a MIB database 350 so as to determine whether an object indicated in the SNMP SET request exists in MIB database 350. If the object indicated in the SNMP SET request does not exist in MIB database 350, then SNMP simulator 310 returns to the user a message indicative of error; if the object indicated in the SNMP SET request exists in MIB database 350, then SNMP simulator 350 extracts from the received SNMP request the OID and the value of the OID and sends the extracted OID and its value to the virtual PDU service component 320 through a pipe. At S430, the virtual PDU service component 320 controls a corresponding node based on the OID and its value.

In addition, if the received SNMP request is an SNMP SET request, then at S420, the MIB handler module 312 further extracts from the received SNMP request the OID and the value of the OID and writes them to the MIB database 350.

If the received SNMP request is an SNMP GET request, then the SNMP simulator 310 extracts the OID from the received SNMP request, and at S420, the MIB handler module 312 reads the value of the OID from the MIB database 350. Subsequently, the SNMP simulator 310 returns the value of the OID to the user.

Further, as shown in FIG. 4, the administrator may, based on the SSH or Telnet protocol and by means of a control service component 360, remotely log on to the virtual PDU service component 320 so as to remotely configure the virtual PDU. For example, at S440, control service component 360 will store to the MIB database 350 dynamic telemetry data that is set with respect to the virtual PDU. At S450, the control service component 360 stores setting for the virtual PDU to a configuration database 370. At S450, the virtual PDU service component 320 reads the setting from configuration database 370. At S470, the control service component 360 starts/stops service of the virtual PDU service component 320.

At S480, the virtual PDU service component 320 obtains resource (e.g. CPU and/or memory) utilization efficiency from one or more nodes of nodes 341-34n, so that power consumption of a corresponding node can be estimated based on the obtained resource utilization efficiency. In this regard, with the embodiments of the present disclosure, not only power supply of physical nodes can be controlled, but also power consumption of virtual nodes (e.g. virtual machines) can be controlled.

At S490, the virtual PDU service component 320 reads or writes MIB data from or to the MIB database 350.

Figure 5:
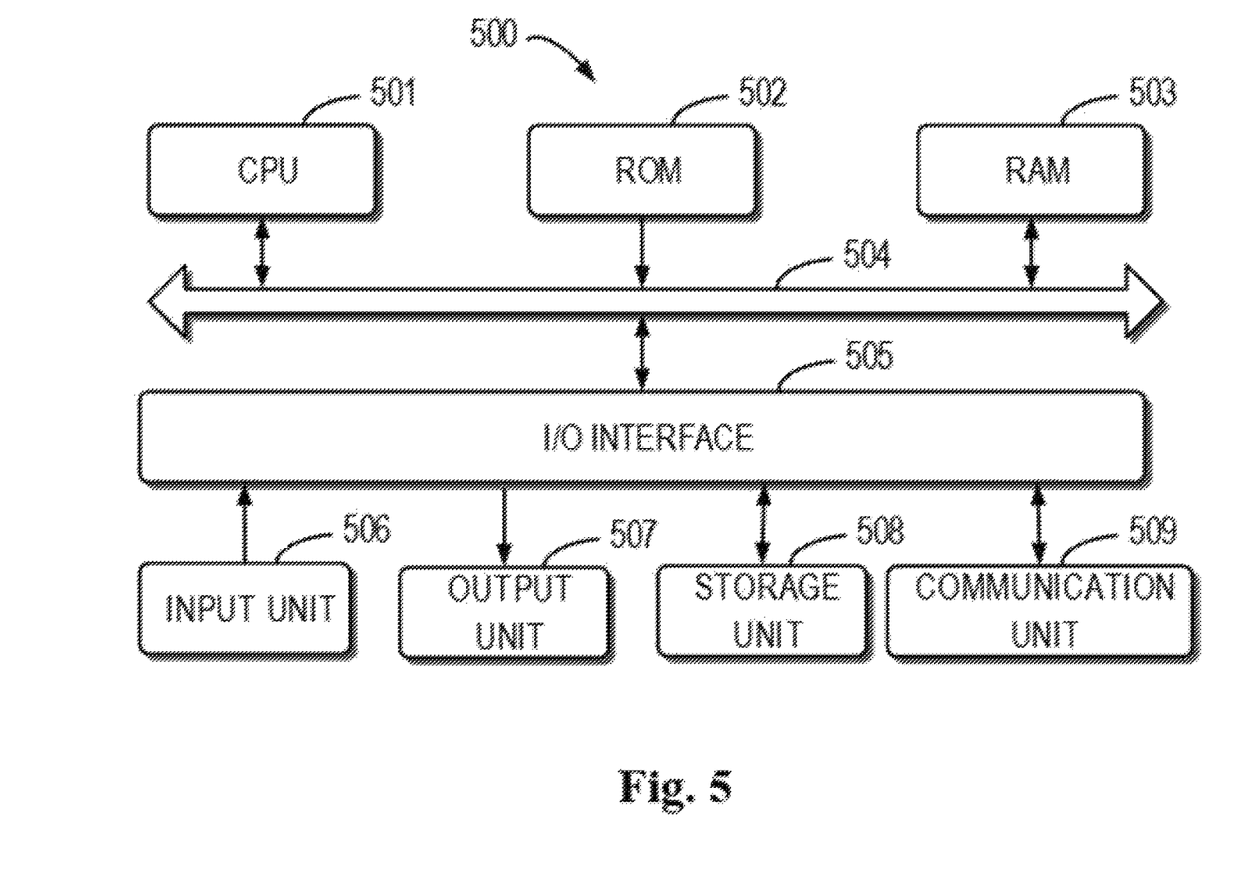
FIG. 5 shows a schematic block diagram of a device which is applicable to implement the embodiments of the present disclosure.

FIG. 5 shows a schematic block diagram of a device 500 suitable for implementing the embodiments of the present disclosure. As shown, the device 500 comprises a central processing unit (CPU) 501 which is capable of performing various processes in accordance with a program stored in a read only memory (ROM) 502 or a program loaded from a storage unit 508 to a random access memory (RAM) 503. In RAM 503, data required when the CPU 501 performs the various processes or the like is also stored as required. The CPU 501, ROM 502 and RAM 503 are connected to one another via a bus 504. An input/output (I/O) interface 505 is also connected to the bus 504.

A plurality of components in the device 500 are connected to the I/O interface 505, comprising: an input unit 506 such as a keyboard, a mouse, or the like; an output unit 507 including various displays, loudspeakers or the like; a storage unit 508 such as a magnetic disk, an optical disk or the like; and a communication unit 509 such as a network interface card, a modem, a wireless communication transceiver or the like. The communication unit 509 allows the device 500 to exchange information/data with other device via the computer network such as the internet and/or various telecommunication networks.

The processes described above, such as the method 100, may be executed by the CPU 501. For example, in some embodiments, the method 100 may be implemented as computer software programs tangibly embodied on a machine readable medium, such as the storage unit 508. In some embodiments, part or all of the computer program may be loaded and/or installed, to the device 500 via the ROM 502 and/or the communication unit 509. The computer program, when loaded to the RAM 503 and executed by the CPU 501, may perform one or more steps of the method 100 as described above.

Generally various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product comprising a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable sub-combination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other embodiments of the disclosures set forth herein will come to mind to one skilled in the art to which these embodiments of the disclosure pertain having the benefit of the teachings presented in the foregoing descriptions and the drawings.

It will be appreciated that the embodiments of the present disclosure are not to be limited to the specific embodiments as discussed above and that modifications and other embodiments are intended to be included within the scope of the appended claims. Although specific terms are used herein, they are used in a generic and descriptive sense only and not for purposes of limitation.

We claim:

1. A method of controlling a network node, comprising:
providing a virtual Power Distribution Unit (PDU) by using a computing device; and
causing the virtual PDU to control power supply of the network node coupled to the virtual PDU according to a type of the network node, wherein the type of the network node includes a virtual type and a physical type, wherein providing the virtual PDU by using the computing device comprises:
providing a control component of the virtual PDU by using the computing device, the control component including a first type of control interface for the virtual type of network node and a second type of control interface for the physical type of network node, the first type of control interface being different from the second type of control interface.

2. The method according to claim 1, wherein causing the virtual PDU to control power supply of the network node comprises:
in response to receiving a control command from a user, causing the control component of the virtual PDU to perform acts including:
identifying a virtual outlet of the virtual PDU to which the control command is directed;
determining whether the type of the network node coupled to the virtual outlet is the virtual type or the physical type; and
using the first type of control interface or the second type of control interface to control the network node based on the determining.

3. The method according to claim 2, wherein using the first type of control interface or the second type of control interface to control the network node based on the determining comprises:
converting, based on the determining, the control command to a control command that is suitable for the first type of control interface or the second type of control interface; and
providing the converted control command to the first type of control interface or the second type of control interface.

4. The method according to claim 1, wherein the virtual type of network node at least includes a first virtual type of network node and a second virtual type of network node, the second virtual type of network node being different from the first virtual type of network node; and
wherein the first type of control interface at least includes a first control interface for the first virtual type of network node and a second control interface for the second virtual type of network node, the first control interface being different from the second control interface.

5. The method according to claim 1, wherein providing the virtual PDU by using the computing device comprises:
causing the virtual PDU to be configured remotely.

6. The method according to claim 5, wherein causing the virtual PDU to be configured remotely comprises:
causing the virtual PDU to receive an error injection; and
causing the virtual PDU to send a notification indicating the error injection to a user.

7. The method according to claim 1, further comprising:
causing the virtual PDU to obtain from the virtual type of network node resource utilization efficiency of the virtual type of network node; and
determining estimation of power consumption of the virtual type of network node based on the obtained resource utilization efficiency.

8. An apparatus of controlling a network node, comprising:
a virtual Power Distribution Unit (PDU) providing unit configured to provide a virtual PDU by using a computing device; and
a control unit configured to cause the virtual PDU to control power supply of the network node coupled to the virtual PDU according to a type of the network node, wherein the type of the network node includes a virtual type and a physical type, wherein the virtual PDU providing unit is further configured to:
provide a control component of the virtual PDU by using the computing device, the control component including a first type of control interface for the virtual type of network node and a second type of control interface for the physical type of network node, the first type of control interface being different from the second type of control interface.

9. The apparatus according to claim 8, wherein the control unit is further configured to:
in response to receiving a control command from a user, cause the control component of the virtual PDU to perform acts including:
identifying a virtual outlet of the virtual PDU to which the control command is directed;
determining whether the type of the network node coupled to the virtual outlet is the virtual type or the physical type; and
using the first type of control interface or the second type of control interface to control the network node based on the determining.

10. The apparatus according to claim 9, wherein the control unit is further configured to:
convert, based on the determining, the control command to a control command that is suitable for the first type of control interface or the second type of control interface; and
provide the converted control command to the first type of control interface or the second type of control interface.

11. The apparatus according to claim 8, wherein the virtual type of network node at least includes a first virtual type of network node and a second virtual type of network node, the second virtual type of network node being different from the first virtual type of network node; and
wherein the first type of control interface at least includes a first control interface for the first virtual type of network node and a second control interface for the second virtual type of network node, the first control interface being different from the second control interface.

12. The apparatus according to claim 8, wherein the control unit is further configured to cause the virtual PDU to be configured remotely.

13. The apparatus according to claim 12, wherein the control unit is further configured to:
cause the virtual PDU to receive an error injection; and
cause the virtual PDU to send a notification indicating the error injection to a user.

14. The apparatus according to claim 8, wherein the control unit is further configured to:
cause the virtual PDU to obtain from the virtual type of network node resource utilization efficiency of the virtual type of network node; and
determine estimation of power consumption of the virtual type of network node based on the obtained resource utilization efficiency.

* * * * *